United States Patent
Brunner et al.

(10) Patent No.: US 8,297,705 B2
(45) Date of Patent: Oct. 30, 2012

(54) ADJUSTABLE HEAD RESTRAINT FOR AN AUTOMOTIVE VEHICLE SEAT

(75) Inventors: Stefan Brunner, Freising (DE); Achim Tscherbner, Allershausen (DE); Bernd Rolf Schwerma, Neuberg (DE)

(73) Assignee: Lear Corporation, Southfield, MI (US)

( * ) Notice: Subject to any disclaimer, the term of this patent is extended or adjusted under 35 U.S.C. 154(b) by 261 days.

(21) Appl. No.: 12/506,529

(22) Filed: Jul. 21, 2009

(65) Prior Publication Data

US 2010/0045090 A1 Feb. 25, 2010

(30) Foreign Application Priority Data

Aug. 22, 2008 (DE) .......................... 10 2008 039 398

(51) Int. Cl.
*A47C 7/36* (2006.01)
(52) U.S. Cl. ...................................................... 297/410
(58) Field of Classification Search ................... 297/410
See application file for complete search history.

(56) References Cited

U.S. PATENT DOCUMENTS

| 4,830,434 | A | | 5/1989 | Ishida et al. |
| 5,816,658 | A | * | 10/1998 | Wallis ............................ 297/410 |
| 6,364,415 | B1 | * | 4/2002 | Mori et al. ..................... 297/410 |
| 7,878,597 | B2 | * | 2/2011 | Bokelmann et al. .......... 297/410 |
| 2003/0103140 | A1 | | 6/2003 | Watkins |
| 2007/0284925 | A1 | | 12/2007 | Balensiefer |
| 2008/0001456 | A1 | * | 1/2008 | Muller et al. ............... 297/354.1 |

FOREIGN PATENT DOCUMENTS

DE 102007048152 B3 1/2009

* cited by examiner

*Primary Examiner* — Sarah B McPartlin
(74) *Attorney, Agent, or Firm* — Brooks Kushman P.C.

(57) ABSTRACT

A head restraint system for an automotive vehicle seat includes a post having first and second end portions, a support member fixedly attached to the second end portion of the post, and a head rest assembly. The support member includes a locking feature. The head rest assembly includes a housing supported by the support member, a locking member, and an actuator configured to move the locking member from a locked position with the locking feature to an unlocked position from the locking feature to permit the headrest assembly to move relative to the post and support member.

19 Claims, 4 Drawing Sheets

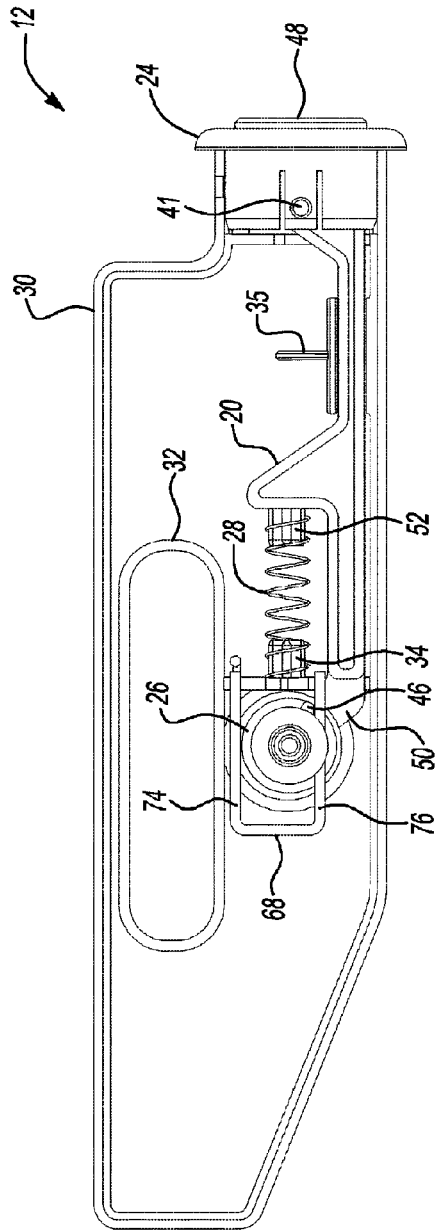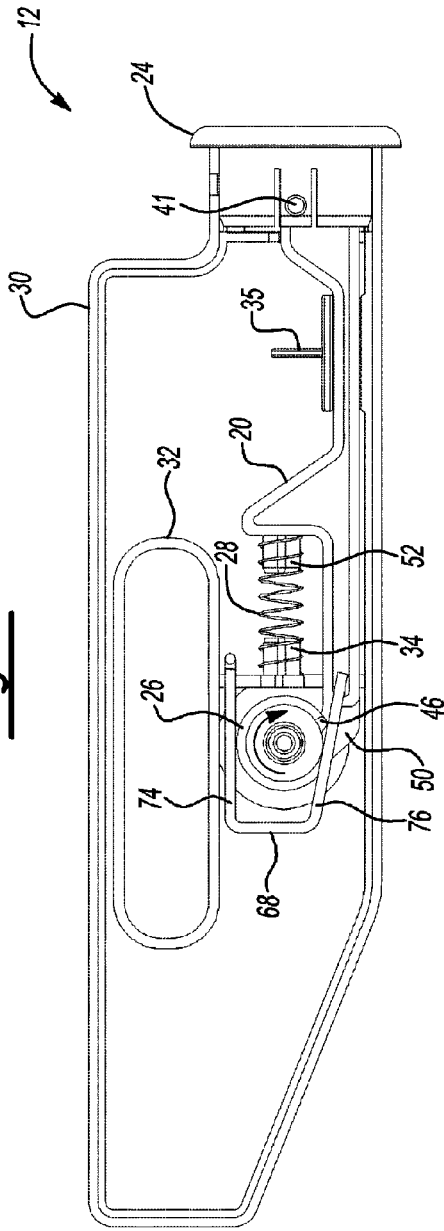

ADJUSTABLE HEAD RESTRAINT FOR AN AUTOMOTIVE VEHICLE SEAT

CROSS-REFERENCE TO RELATED APPLICATIONS

This application claims foreign priority benefits under 35 U.S.C. §119(a)-(d) to DE 10 2008 039 398.3, filed Aug. 22, 2008, which is hereby incorporated by reference in its entirety.

BACKGROUND

Vehicle seats may include adjustable head restraints. As an example, U.S. Pat. No. 4,830,434 to Ishida et al. discloses an adjustable head rest device for a vehicle seat. The device includes a head rest body for supporting the head of an occupant of the seat. The device further includes an adjusting member for adjusting the position of the head rest body with respect to the seat continuously within a defined range of movement.

As another example, U.S. Pat. No. 7,316,455 to Metz et al. discloses a locking device and a headrest. The locking device includes spring elements which can be engaged in at least one locking position. The locking device can be displaced in relation to at least two retaining bars that have a number of recesses. The spring elements co-operate with the recesses in such a way that engagement of the spring elements in their locking position locks the locking device in relation to the retaining bars. The spring elements are configured in such as way that the retaining bars are locked by the mechanical fixing of the spring elements in their central zone or by exertion of a force on the spring elements in their central zone.

SUMMARY

A head restraint system for an automotive vehicle seat includes a post having first and second end portions. The first end portion is capable of being attached to the seat. The system also includes a support member fixedly attached to the second end portion of the post, and a head rest assembly. The support member includes a locking feature. The head rest assembly includes a housing supported by the support member, a locking member and an actuator configured to move the locking member from a locked position with the locking feature to an unlocked position from the locking feature to permit the headrest assembly to move relative to the post and support member.

An automotive vehicle seat includes a seat back and a post having first and second end portions. The first end portion is fixedly attached to the seat back. The seat also includes a structural member fixedly attached to the second end portion of the post, and a head rest assembly. The head rest assembly includes a housing supported by the structural member, and an engagement member. The structural member includes a portion configured to receive the engagement member and has an engagement feature disposed therein. The head rest assembly also includes an actuator configured to move the engagement member from an engaged position with the engagement feature to a disengaged position from the engagement feature to permit the housing, engagement member and actuator to move relative to the post and structural member.

A head restraint system for an automotive vehicle seat includes a guide member having first and second end portions. The first end portion is capable of being fixedly attached to the seat. The system also includes a support member fixedly attached to the second end portion of the guide member, a retention member carried by the support member, and a head rest assembly. The head rest assembly includes a notched shaft configured to be retained by the retention member, and an actuator configured to rotate the notched shaft relative to the retention member to permit the headrest assembly to move relative to the post and support member.

While example embodiments in accordance with the invention are illustrated and disclosed, such disclosure should not be construed to limit the invention. It is anticipated that various modifications and alternative designs may be made without departing from the scope of the invention.

BRIEF DESCRIPTION OF THE DRAWINGS

FIG. 5 is a bottom view of a portion of the head restraint of FIG. 1; and

FIG. 6 is another bottom view of the portion of the head restraint of FIG. 1.

DETAILED DESCRIPTION

Figure 1:
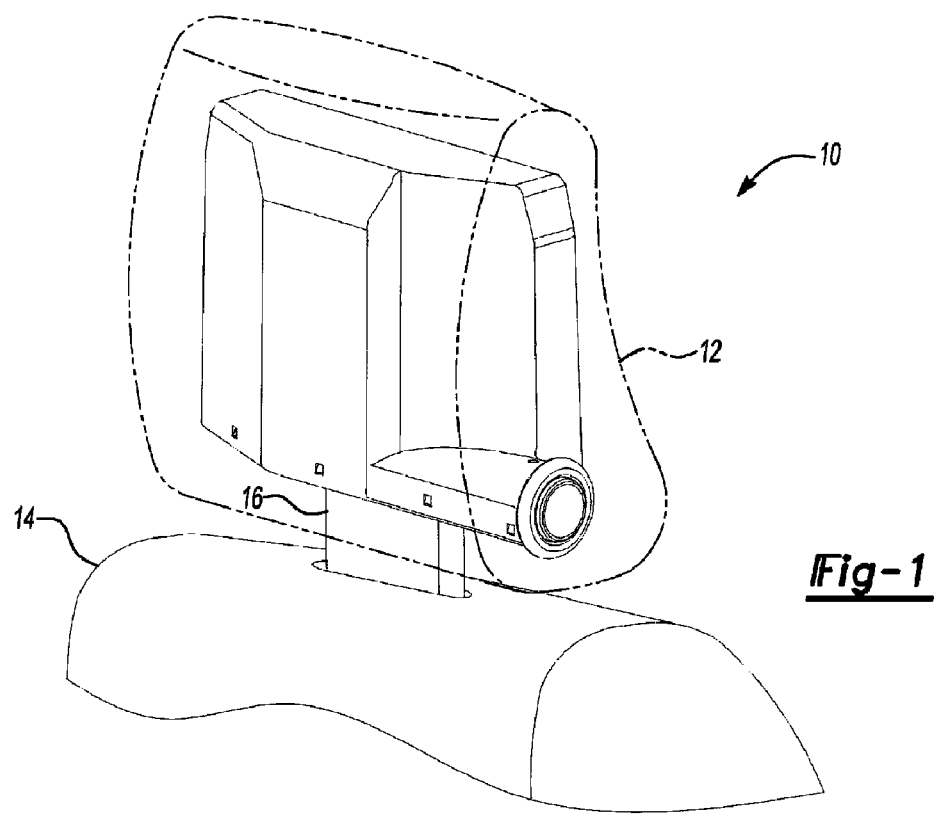
FIG. 1 is a perspective view of a portion of an automotive vehicle seat including an adjustable head restraint according to an embodiment of the invention.

Referring now to FIG. 1, an automotive vehicle seat 10 includes a head rest 12 and a seat back 14. The head rest 12 is coupled to the seat back 14 via a post 16. The post 16 may be attached with the seat back 14 in any suitable fashion. For example, the post 16 may be fastened or otherwise fixedly attached to a frame (not shown) of the seat back 14. The post 16 may also be movably attached with the frame. Other arrangements are also possible. As discussed in more detail below, the head rest 12 is movable relative to post 16 and thus the seat back 14.

Figure 3:
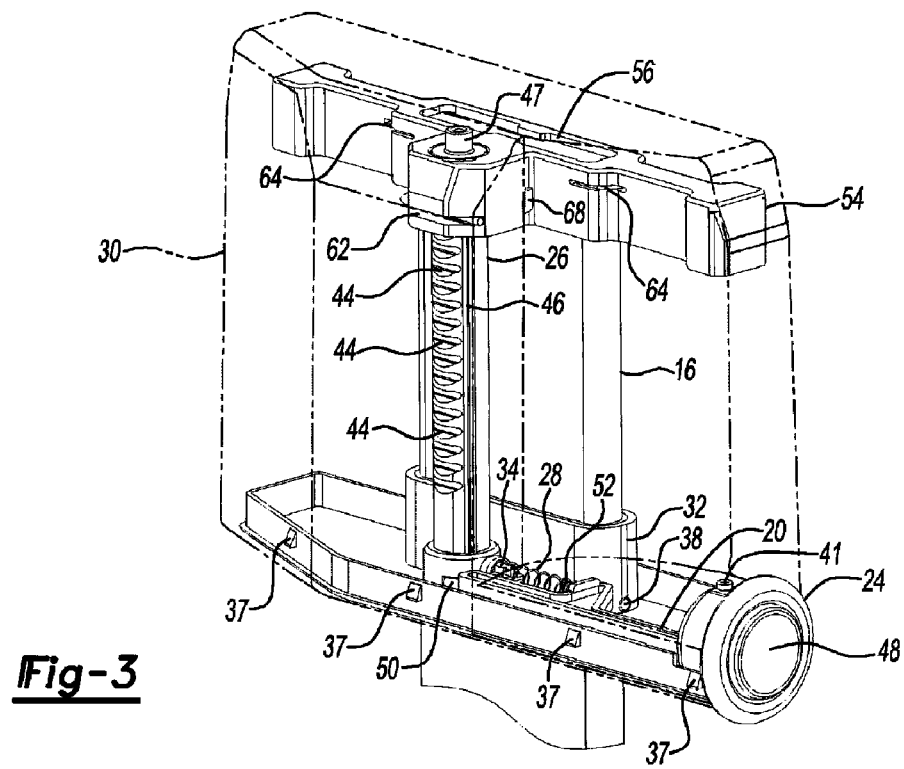
FIG. 3 is an assembly view of the adjustable head restraint of FIG. 2.
Figure 2:
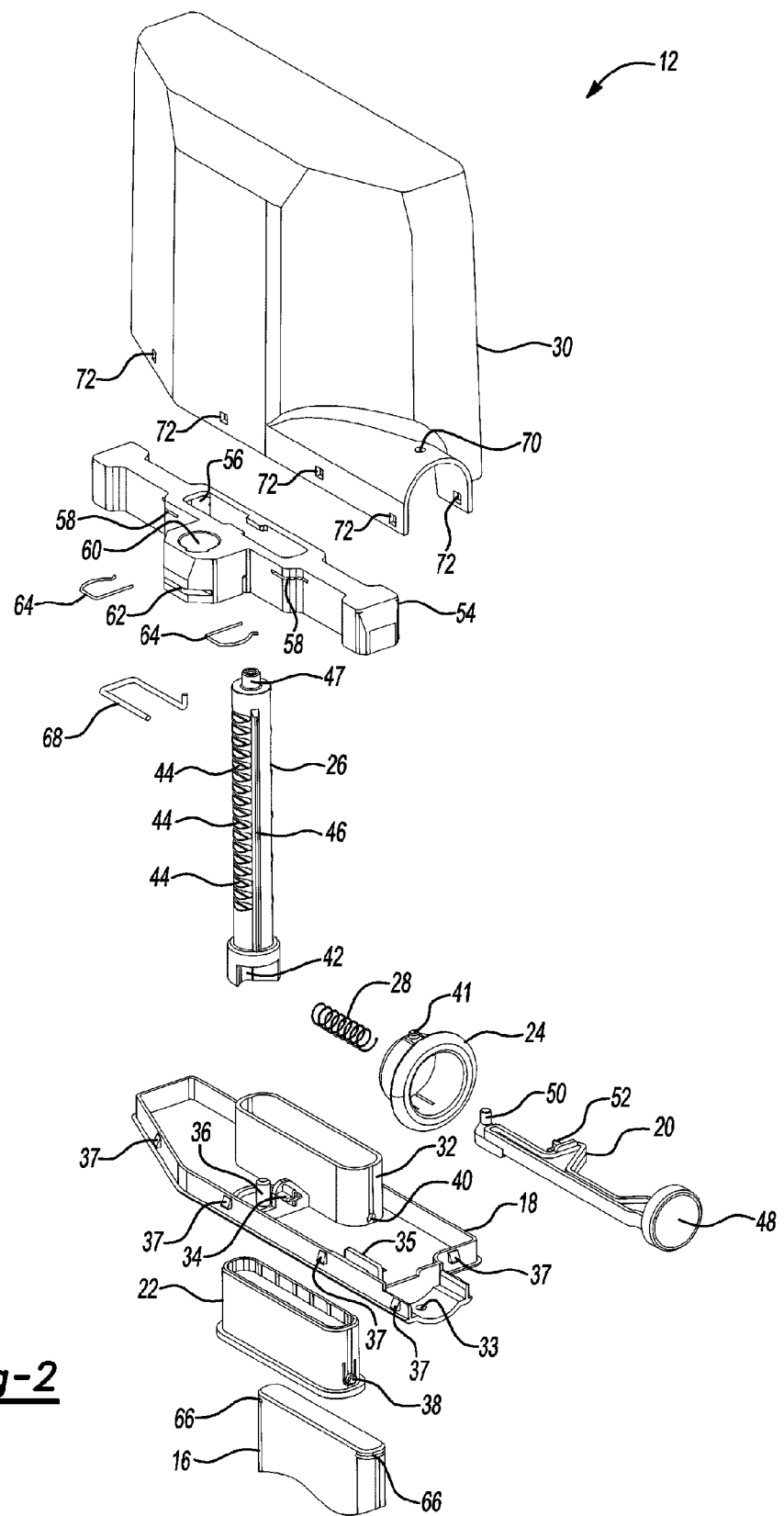
FIG. 2 is an exploded view of the adjustable head restraint of FIG. 1.

Referring now to FIGS. 2 and 3, the head rest 12 may include a tray 18, button actuator 20, sleeve 22 and collar 24. The head rest 12 may also include a column member 26, coil spring 28 and housing 30. The tray 18 may include a post receiving portion 32, female locator 33, coil spring locator 34, actuator guide 35, column locator 36 and retention features 37. The sleeve 22 may include a male protrusion 38 and the post receiving portion 32 may include a female receiving portion 40. The collar 24 may include male locators 41 (on the top and bottom, as illustrated, of the collar 24). With reference to the above and below described elements, however, other and/or different components may also be used.

The sleeve 22 may be disposed within the post receiving portion 32 and located relative to the post receiving portion 32 via the male protrusion 38 and female receiving portion 40. The sleeve 22 may be configured to and/or comprise a material, e.g., plastic, that facilitates the movement of the head rest 12 relative to the post 16.

The column member 26 may include a recessed portion 42, column locator receiving portion (not shown), e.g., an aperture, adjacent the recessed portion 42, a plurality of notches 44 disposed axially along the column member 26, raised portion 46 also disposed axially along the column member 26 and top portion 47. The button actuator 20 may include a button 48, end portion 50 and coil spring locator 52.

The column member 26 may be located relative to (and be carried by) the tray 18 via the column locator 36 and column locator receiving portion (not shown). In the embodiment of FIGS. 2 and 3, the column member 26 is positioned generally parallel to and spaced away from the post 16. In other embodiments, however, the column member 26 may have any suitable orientation and/or position relative to the post 16. Additionally, the column member 26 may take any desired shape and/or form.

The button actuator 20 may also be carried by the tray 18 and arranged such that the end portion 50 of the button actuator 20 is operatively engaged with the recessed portion 42 of the column member 26. The coil spring 28 may further be located between the coil spring locators 34, 52 of the tray 18 and actuator button 20 respectively. As discussed below, the button 48 may be pushed by an occupant of the vehicle seat 10 to rotate the column member 26 about the column locator 36. The actuator guide 35 may guide the actuator button 20 as it travels relative to the tray 18.

A structural member 54 includes a post receiving portion 56, clip slots 58, column member receiving portion 60 and spring slot 62. The structural member 54 may fit over an end of (and be fixed to) the post 16 via clips 64. In the embodiment of FIGS. 2 and 3, retainer clips 64 are inserted into the clip slots 58 and clip receivers 66 of the post 16. The retainer clips 64 anchor the structural member 54 to the post 16. The structural member 54, however, may be attached to the post 16 in any suitable fashion. For example, the structural member 54 may be bolted to the post 16.

The top portion 47 of the column member 26 may be inserted into the column member receiving portion 60. A spring clip 68 may be inserted into the spring slot 62. As discussed below, the spring clip 68 may engage the notches 44 of the column member 26 to hold the head rest 12 in place relative to the post 16 and structural member 54. The spring clip 68 may also be disengaged from the notches 44 to allow the head rest 12 to move relative to the post 16 and structural member 54. In other embodiments, however, any suitable locking and/or retention arrangement may be used. As an example, the column member 26 may include a plurality of protrusions disposed axially along the column member 26. These protrusions may be received by a suitable aperture disposed within the column member receiving portion 60. As another example, the column member receiving portion 60 may include a spring loaded button that may engage a suitable aperture in the column member 26. A lever coupled with the housing 30 may be operatively arranged to retract the spring loaded button such that it disengages the column member 26, thus allowing it to move.

The housing 30 includes a female locator 70 and retention receiving features 72. The collar 24 may be located relative to the tray 18 and housing 30 via the male locators 41 and the female locators 33, 70. The collar 24 positions the button 48 relative to the housing 30. The housing 30 may be placed over the above mentioned components and secured to the tray 18 via the retention features 37 and the retention receiving features 72. The structural member 54 thus provides support for the housing 30.

Of course, FIGS. 2 and 3 illustrate but one embodiment. Other configurations are also possible. As an example, the arrangement illustrated in FIGS. 2 and 3 may be inverted such that the structural member 54 may be fastened to the post 16 below the tray 18 and the push button 48 may be located near the top of the housing 30. As another example, more than one post 16, e.g., two spaced apart posts, may be used. Two column members 26 (one for each post) and associated components may also be used.

Similarly, the components described with reference to FIGS. 2 and 3 may also take various forms and certain of them may be omitted. As an example, an actuator, e.g., a lever, may be operatively associated with the column member receiving portion 60. Pressing the actuator may disengage a lock from a sliding member connecting the tray 18 and the structural member 54, such as the column member 26. As yet another example, the column member 26 may be spring loaded via an internal coil spring. As the column member 26 rotates, the internal coil spring may store energy that will later assist in returning it to its initial position. The structural member 54 may include a protrusion that engages the column member 26 in such configurations.

Figure 4:
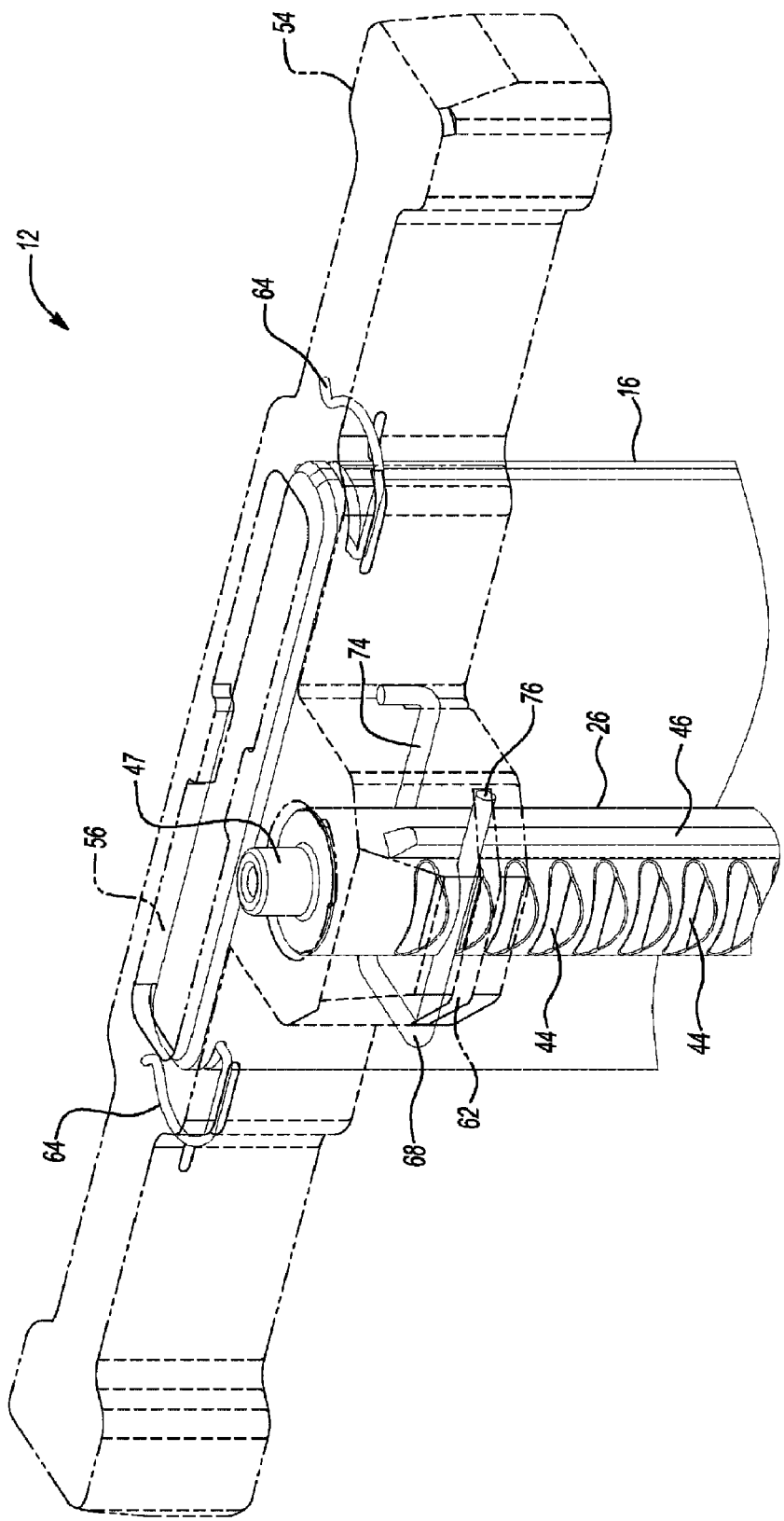
FIG. 4 is an enlarged view of a portion of the adjustable head restraint of FIG. 3.

Referring now to FIG. 4, the spring clip 68 may be U-shaped and span the thickness of the column member 26. The spring clip 68 may include a rear arm 74 and a front arm 76. As illustrated, the rear arm 74 is disposed behind the column member 26 and the front arm 76 is disposed in front of the column member 26 and engaged with one of the recesses 44 of the column member 26. As mentioned above, the button 48 may be pressed to rotate the column member 26 about the column locator 36 illustrated in FIG. 2. As the column member 26 rotates, the raised portion 46 of the column member 26 makes contact with the front arm 76 of the spring clip 68 and lifts the front arm 76 out of the recess 44. Once disengaged from the front arm 76, the column member 26 (and thus the head rest 12) may move relative to the post 16 and structural member 54.

Referring now to FIG. 5, the button actuator 20, as illustrated, is in the un-pressed position. The coil spring 28 is extended and the front arm 76 of the spring clip 68 is engaged with a notch (not shown) of the column member 26. As mentioned above, the spring clip 68 is U-shaped when the button actuator 20 is un-pressed.

Referring now to FIG. 6, the button actuator 20, as illustrated, is in the pressed position. The coil spring 28 is compressed and thus exerts a force generally opposite the pressing direction. The column member 26 has rotated clockwise permitting the raised portion 46 of the column member 26 to raise the front arm 76 of the spring clip 68 thus disengaging the spring clip 68 from the notch (not shown). In this position, the height of the head rest 12 may be adjusted relative to the seat back 14 illustrated in FIG. 1.

In the absence of a force pressing the button 48, the coil spring 28 will drive the button actuator 20 back to the un-pressed position illustrated in FIG. 5. As the button actuator 20 returns to the un-pressed position, the spring clip 68, which was deformed by the rotation of the column member 26, will exert a force on the raised portion 46 of the column member 26 prompting the column member 26 to rotate counter-clockwise until the spring clip 68 returns to its un-deformed position and reengages one of the notches 44 of the column member 26 thus securing the head rest 12 relative to the post 16 and structural member 54 illustrated in FIGS. 2 and 3.

While example embodiments in accordance with the invention are illustrated and disclosed, such disclosure should not be construed to limit the invention. It is anticipated that various modifications and alternative designs may be made without departing from the scope of the invention.

What is claimed is:
1. A head restraint system for an automotive vehicle seat comprising:
  no more than one post having first and second end portions, the first end portion capable of being attached to the seat;
  a support member fixedly attached to the second end portion of the post and including a locking feature; and a head rest assembly configured to receive the support member and second end portion of the post and including (i) a housing supported by the support member, (ii) a locking member and (iii) an actuator configured to move the locking member from a locked position with the locking feature to an unlocked position from the locking feature to permit the headrest assembly to move along the post relative to the support member.

2. The system of claim 1 wherein the locking member comprises a shaft having a plurality of notches formed therein.

3. The system of claim 2 wherein the locking feature comprises a clip spring configured to engage at least one of the notches when the shaft is in the locked position.

4. The system of claim 2 wherein the shaft is disposed generally parallel to, and spaced away from, the post.

5. The system of claim 1 wherein the actuator is configured to rotate the locking member from the locked position to the unlocked position.

6. The system of claim 5 further comprising a coil spring configured to resist movement of the actuator.

7. The system of claim 1 wherein the head rest assembly further includes a tray portion configured to carry at least one of the locking member and actuator.

8. The system of claim 1 wherein the actuator comprises a push button.

9. An automotive vehicle seat comprising:
a seat back;
no more than one post having first and second end portions, the first end portion fixedly attached to the seat back;
a structural member fixedly attached to the second end portion of the post; and
a head rest assembly configured to receive the structural member and second end portion of the post and including (i) a housing supported by the structural member, (ii) an engagement member, the structural member including a portion configured to receive the engagement member and having an engagement feature disposed therein and (iii) an actuator configured to move the engagement member from an engaged position with the engagement feature to a disengaged position from the engagement feature to permit the housing, engagement member and actuator to move along the post and relative to the structural member.

10. The system of claim 9 wherein the engagement member comprises a shaft having a plurality of notches formed therein.

11. The system of claim 10 wherein the engagement feature comprises a spring clip configured to engage at least one of the notches when the shaft is in the locked position.

12. The system of claim 10 wherein the shaft is disposed generally parallel to, and spaced away from, the post.

13. The system of claim 9 wherein the actuator is configured to rotate the engagement member from the locked position to the unlocked position.

14. The system of claim 13 further comprising a coil spring configured to resist movement of the actuator.

15. The system of claim 9 wherein the head rest assembly further includes a tray portion configured to carry at least one of the engagement member and actuator.

16. The system of claim 9 wherein the actuator comprises a push button.

17. A head restraint system for an automotive vehicle seat comprising:
no more than one guide member having first and second end portions, the first end portion capable of being fixedly attached to the seat;
a support member fixedly attached to the second end portion of the guide member;
a retention member carried by the support member; and
a head rest assembly configured to receive the support member and second end portion of the guide member and including a notched shaft configured to be retained by the retention member and an actuator configured to rotate the notched shaft relative to the retention member to permit the headrest assembly to move along the guide member and relative to the support member.

18. The system of claim 17 further comprising a coil spring configured to resist movement of the actuator.

19. The system of claim 17 wherein the shaft is disposed generally parallel to, and spaced away from, the guide member.

* * * * *